(12) United States Patent
Mott et al.

(10) Patent No.: US 7,201,687 B2
(45) Date of Patent: Apr. 10, 2007

(54) POWER TRANSMISSION CHAIN WITH CERAMIC JOINT COMPONENTS

(75) Inventors: Philip J. Mott, Dryden, NY (US); Timothy J. Ledvina, Groton, NY (US); James Wyckoff, Interlaken, NY (US)

(73) Assignee: BorgWarner Inc., Auburn Hills, MI (US)

( * ) Notice: Subject to any disclaimer, the term of this patent is extended or adjusted under 35 U.S.C. 154(b) by 153 days.

(21) Appl. No.: 10/379,669

(22) Filed: Mar. 6, 2003

(65) Prior Publication Data

US 2004/0176201 A1 Sep. 9, 2004

(51) Int. Cl.
 *F16G 13/08* (2006.01)
 *F16H 7/06* (2006.01)
 *B21L 9/00* (2006.01)

(52) U.S. Cl. .................... 474/157; 156/215; 29/527.1; 59/5; 59/88

(58) Field of Classification Search ........ 474/213–215, 474/230–229, 152–156, 202, 157; 418/152, 418/206.9; 396/612, 620; 264/28, 328.2; 156/89; 428/539.5, 545; 59/4, 5, 88; 29/527.1
See application file for complete search history.

(56) References Cited

U.S. PATENT DOCUMENTS

| | | | |
|---|---|---|---|
| 3,742,776 A * | 7/1973 | Avramidis | 474/215 |
| 3,858,827 A | 1/1975 | Glassbrook | |
| 4,174,642 A * | 11/1979 | Martin et al. | 474/156 |
| 4,316,964 A | 2/1982 | Lange | |
| 4,342,560 A | 8/1982 | Ledvina et al. | |
| 4,487,157 A | 12/1984 | Bergeron et al. | |
| 4,640,902 A | 2/1987 | Lange | |
| 4,704,098 A | 11/1987 | Tsubakimoto | |
| 4,704,099 A | 11/1987 | Rohloff | |
| 4,832,668 A | 5/1989 | Ledvina et al. | |
| 4,853,353 A | 8/1989 | Whalen et al. | |
| 4,886,768 A | 12/1989 | Tien | |
| 4,906,224 A | 3/1990 | Reber | |
| 4,911,681 A | 3/1990 | Funkhouser | |
| 5,002,909 A | 3/1991 | Montino et al. | |
| 5,008,221 A | 4/1991 | Ketcham | |

(Continued)

FOREIGN PATENT DOCUMENTS

DE 4307898 A1 * 9/1994

(Continued)

OTHER PUBLICATIONS

European Search Report No. 04251186.5-2424 dated Jun. 3, 2004.

*Primary Examiner*—Marcus Charles
(74) *Attorney, Agent, or Firm*—Fitch, Even, Tabin & Flannery

(57) ABSTRACT

Power transmission chains (10, 40, 60) which are suitable for automotive uses as well as other uses and which have a reduced susceptibility to wear and corrosion, in which such chains (10, 40, 60) are constructed to include a plurality of sets (12, 14) of links (11, 13) joined at overlapped ends (11a, 13a) thereof by a pivot (16) including at least one ceramic joint component (16), such as a pivot means (16). Such chains (10) also include means (18a, 18b) to drivingly engage sprocket teeth (37) of a sprocket drive (35).

21 Claims, 7 Drawing Sheets

U.S. PATENT DOCUMENTS

| | | | |
|---|---|---|---|
| 5,032,555 A | | 7/1991 | Yamanis et al. |
| 5,069,331 A | | 12/1991 | Bartkowiak |
| 5,114,384 A | | 5/1992 | Tsuyama |
| 5,141,379 A | * | 8/1992 | Warga ................. 198/853 |
| 5,350,637 A | * | 9/1994 | Ketcham et al. ......... 428/539.5 |
| 5,433,313 A | | 7/1995 | Deschner |
| 5,556,816 A | | 9/1996 | Kim et al. |
| 5,651,746 A | | 7/1997 | Okuda |
| 5,762,485 A | * | 6/1998 | Ghosh et al. ............ 418/152 |
| 5,803,852 A | | 9/1998 | Agostinelli et al. |
| 5,806,297 A | | 9/1998 | Tanaka |
| 5,829,850 A | | 11/1998 | Ketting et al. |
| 5,884,387 A | | 3/1999 | Ghosh et al. |
| 5,932,507 A | | 8/1999 | van Weeren et al. |
| 6,050,234 A | | 4/2000 | Hannoosh |
| 6,105,356 A | | 8/2000 | Capstick et al. |
| 6,136,232 A | | 10/2000 | Burlingame |
| 6,164,846 A | * | 12/2000 | Chatterjee et al. ......... 396/612 |
| RE37,254 E | | 7/2001 | Ketting et al. |
| 2002/0025867 A1 | | 2/2002 | Horie et al. |

FOREIGN PATENT DOCUMENTS

| | | | | |
|---|---|---|---|---|
| DE | 4328701 A1 | * | 3/1995 | |
| EP | 1258654 A1 | | 10/2002 | |
| FR | 2778957 | | 11/1999 | |
| GB | 2400647 A | | 10/2004 | |
| JP | 58217847 | | 12/1953 | |
| JP | 627153077 | | 7/1987 | |
| JP | 62285806 | | 12/1987 | |
| JP | 01-284480 A | * | 11/1989 | ............ 164/80 |
| JP | 02-221006 A | * | 9/1990 | |
| JP | 02-221009 A | * | 9/1990 | |
| JP | 9014849 | | 1/1997 | |
| JP | 10281241 | | 10/1998 | |
| JP | 2001-108022 A | * | 4/2001 | |

* cited by examiner

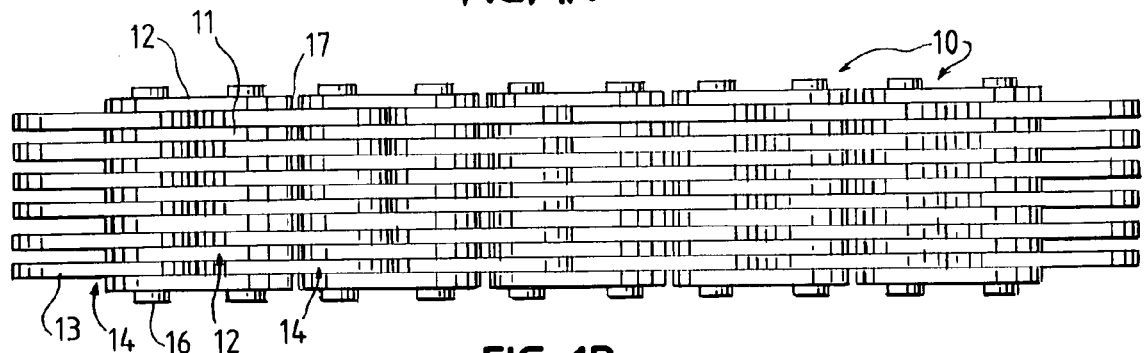
FIG. 1A
FIG. 1B
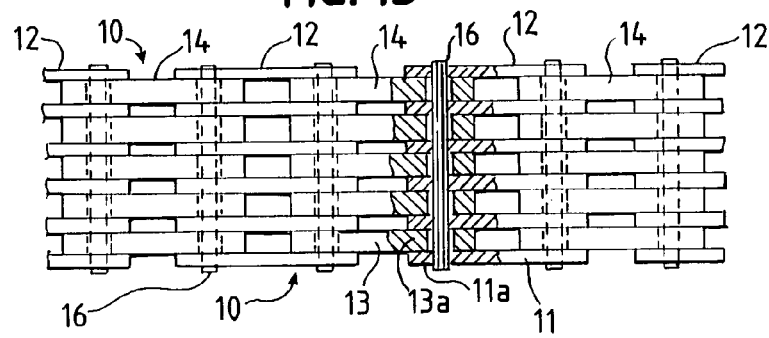
FIG. 2A
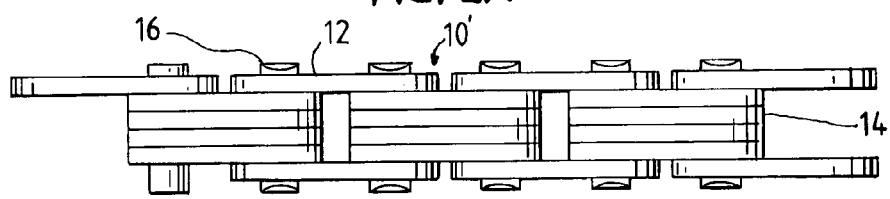
FIG. 2B
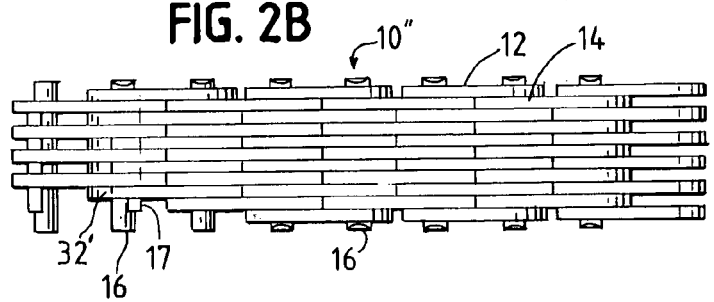

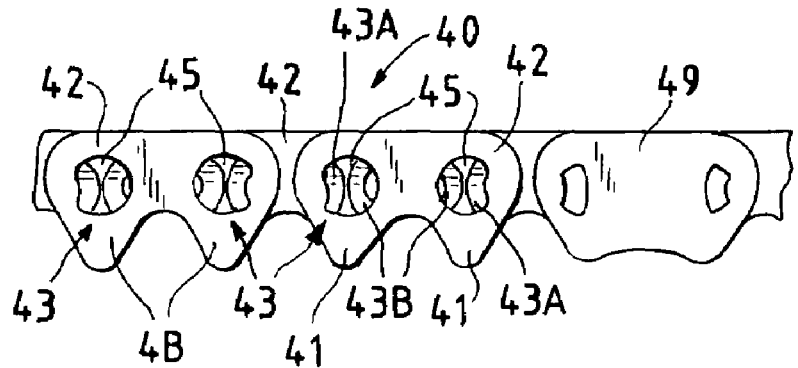
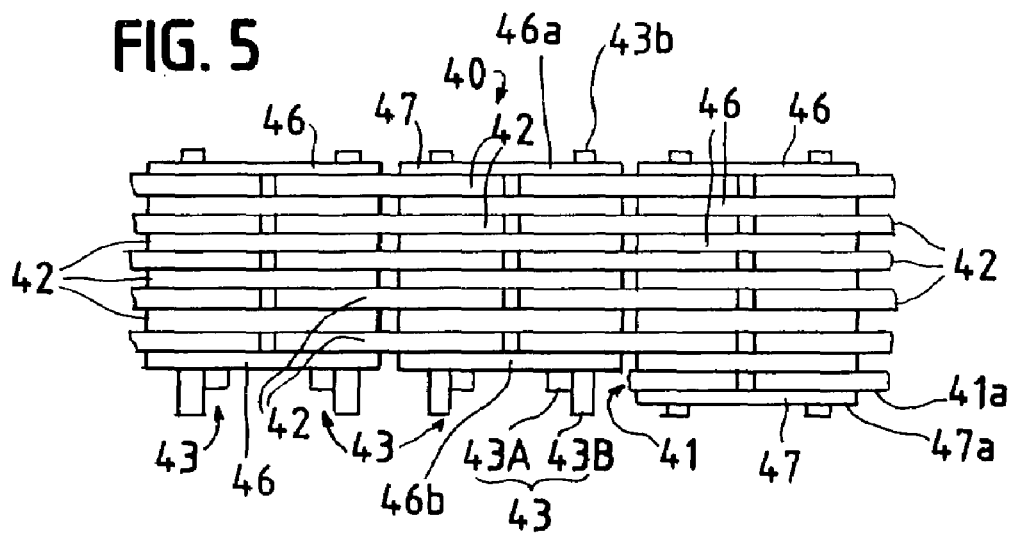
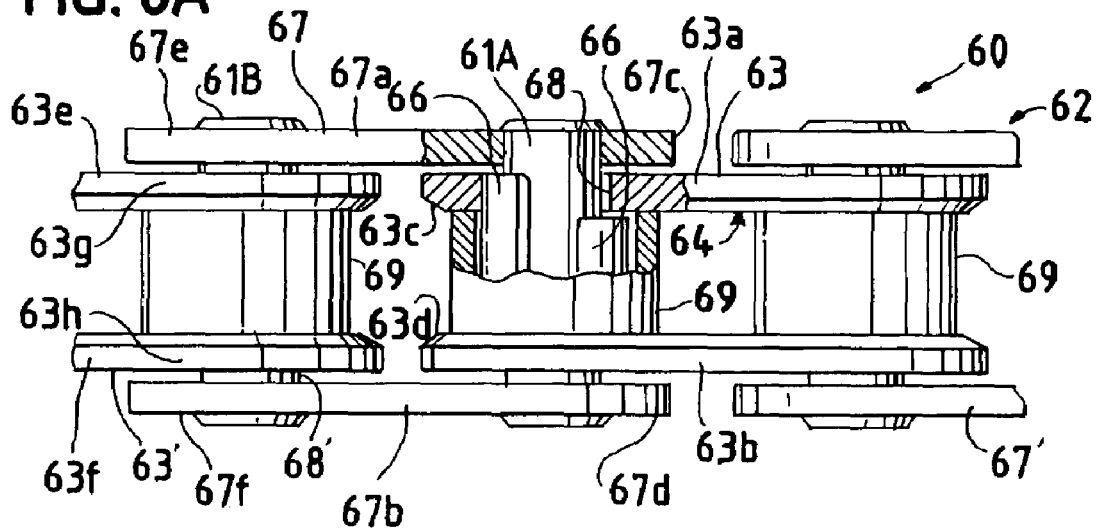

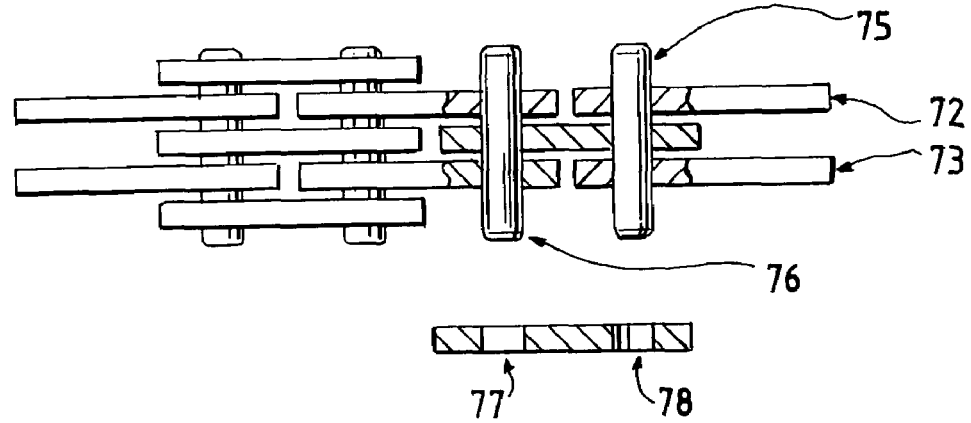
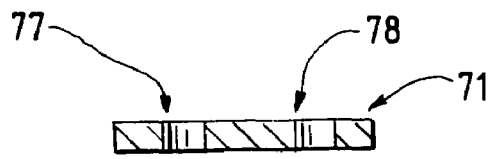
FIG. 7A
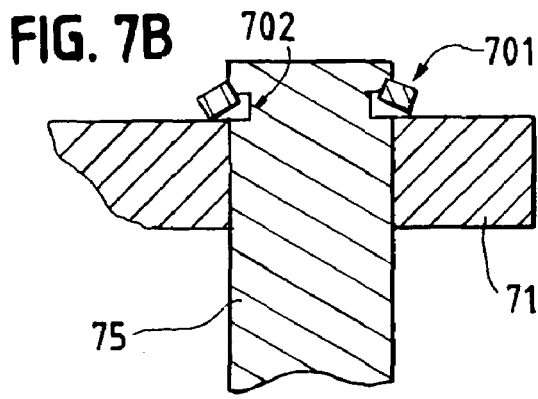
FIG. 7B
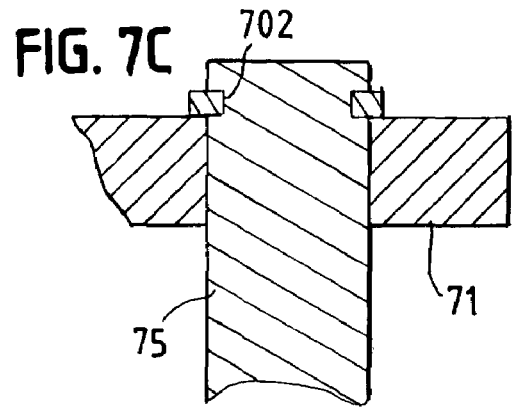
FIG. 7C
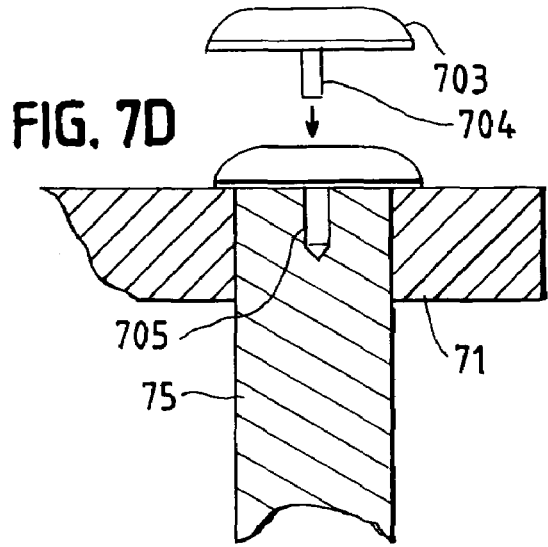
FIG. 7D
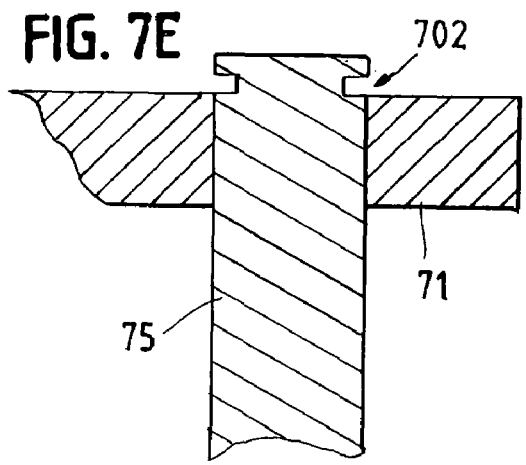
FIG. 7E

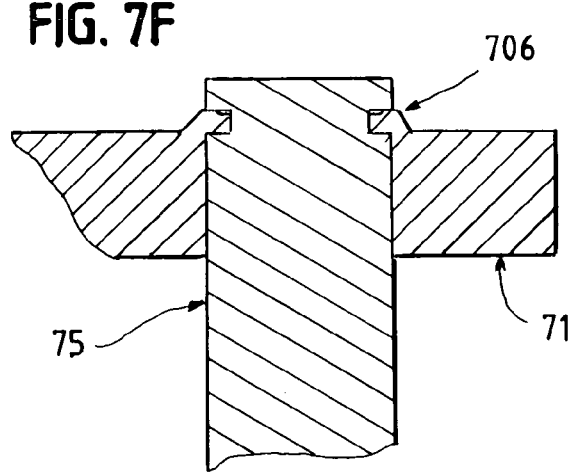
FIG. 7F
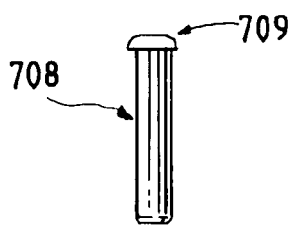
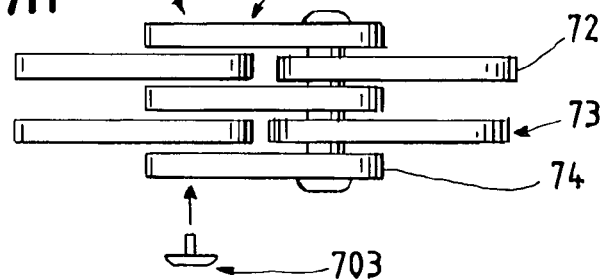
FIG. 7H
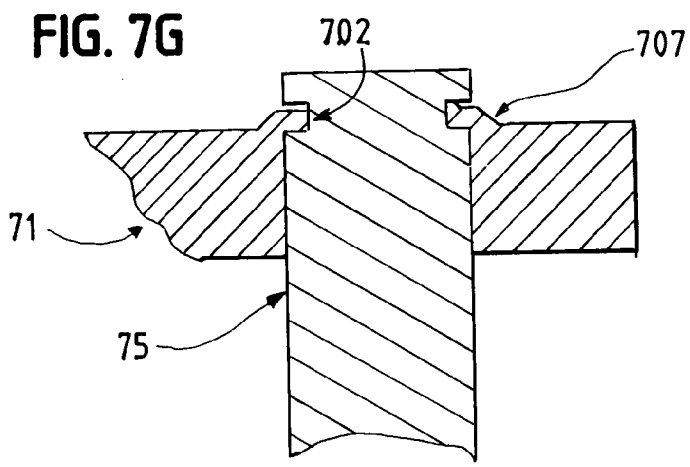
FIG. 7G

POWER TRANSMISSION CHAIN WITH CERAMIC JOINT COMPONENTS

FIELD OF THE INVENTION

This invention relates generally to chains for automotive timing or other power transmission applications, and, more particularly to such chains including ceramic joint components.

BACKGROUND OF THE INVENTION

Power transmission chains are widely used in the automotive industry not only for ignition timing, but also for transferring mechanical power to the driving wheels of a vehicle.

One conventional type of power transmission chain used for automotive timing chain applications, for instance, is referred to as a "silent chain". These chains, in general, are constructed of a plurality of interleaved sets of metallic links with adjacent sets of links joined together by pivot means. Each chain link of such silent chains has a pair of toes separated by a crotch, in which each toe is defined by an inside flank and an outside flank, with the inside flanks being joined by or at the crotch. Each such link also has a pair of apertures, which are connected by the pivot means. The pivot means used in the past in such silent chains have been metallic joint components, such as metallic roller pins or metallic rocker pins. Such silent chains and link components thereof have been adapted to be used with toothed sprockets in the power transmission assembly or arrangement. Historically, the inside flank or flanks of the links of such silent chains have been used to engage the sprockets in automotive timing or motion transferring chain applications. The metallic pins and rocker joints must be dimensioned within very tight tolerances to avoid loose connections from occurring between separate sets of links.

In the manufacture of such conventional silent chains, a preload or tensile load typically is applied after assembly of the chain and before the chain is put into service. Application of the preload is done to preadjust the length of the chain before actual loads are applied to the chain in a power transmission application. The preload causes an alteration of the chain length and provides an initial stress. If such preloads were not induced in the case of conventional silent chain constructions, the chains could be susceptible to relatively significant initial elongation when the chain is first placed in service, which is undesirable. However, when a preload is applied to a conventional silent chain construction, the load acts on the roller pins such that the flanks of the rocker pins press against the walls of the apertures in the link plates, thereby tending to seat the rocker pin in the aperture providing greater contact area between the rocker pins and the apertures and reducing wear. As a result, undesirable offsets of the chain pitch could occur with regard to the apertures, which could adversely affect the performance of the chain. Consequently, conventional silent chain constructions have a possible shortcoming associated with the preload requirements.

Another conventional timing chain configuration is the roller chain construction. One conventional roller chain construction generally includes a plurality of inner link plate pairs and outer link plate pairs arranged alternately in tandem and joined together in an articulated manner. To achieve such a construction, each inner link has been provided as at least two inner plates arranged substantially parallel and transversely spaced from one another. These inner plates have coaxially aligned pin holes at their respective ends for receiving a metal pin at each end thereof. A bushing is fastened, such as by press fitting, between each of the pair of holes located at the respective ends of the two inner plates of each inner link. The outer links each include at least two parallel, spaced apart outer plates that are joined to each other using a joint component such as a single round pin. To accomplish this, a pin joining two adjacent ends of the outer plates of each outer link projects through holes at associated ends of intervening inner plates of a first adjacent inner link, while a pin joining the other ends of the outer plates of the same outer link projects through holes of ends of inner plates of a second adjacent inner link. A rotatable cylindrical roller is mounted on each bushing such that the roller is located between the inner plates. Each such roller is capable of loose rotation on its associated bushing. The roller chains mesh with sprockets with their rollers drivingly engaging the flanks of the sprocket teeth.

For silent chain constructions, wear in link components can be a significant concern. Link wear develops due to the movement of the chain links under load as they engage the sprockets. Lubrication of metal chain components with oil or grease has long been used as a strategy to reduce chain wear. However, the lubricants tend to capture grit and other particulate debris that can come into contact with the chain. This can lead to the unintended effect of causing wear and abrasion on chain components. This chain wear can be even further exacerbated by other factors.

For instance, in automotive timing chain applications, increased risk of wear also has been associated with direct injection gasoline engines. The fuel formulations developed and used for that purpose are prone to undergo adverse chemical reactions with conventional chain lubricants. Among other things, these inadvertent chemical reactions make the oil more acidic, and thus potentially corrosive to metallic drive chain components contacted by the contaminated lubricant. In addition, these adverse chemical reactions degrade the overall lubricity and performance of the oil, which permits more wear to occur in chain components. Increased wear problems also have been associated with diesel engines, such as those used in passenger car applications. Namely, the use of diesel fuel in a combustion engine leads to the build-up of sulfur in the oil used to lubricate the chain, which can result in the formation of corrosive acids in the oil. These acids are corrosive to metals and thus they can chemically attack metallic drive chain components. Singly or in combination, these above-mentioned phenomena accelerate wear and degradation of timing and power transmission drive chains.

Wear, corrosion and abrasion of chain component surfaces, such as joint components, is a problem because it leads to loss of material in the chain components, especially joint components such as metal pins and bushings, and also rollers (if used). This lost material can itself further contaminate the lubricating oil, and consequently contribute to increased abrasive wear on the chain. This loss of material ultimately creates a gap between different joint components of the drive chain. These gaps cause the chain to "stretch" or increase in length from its original length. The overall tension on such stretched chains have been modified by taking-up the resulting chain slack, such as by using a conventional blade spring tensioner. In addition, the loss of material and corrosion can compromise the mechanical properties required of the chain. Moreover, the amount of wear and/or corrosion may not occur uniformly from one chain link to the next throughout the chain, such that uniform meshing engagement of the worn chain and sprockets may not be possible, even if the overall chain is retensioned. As a consequence, the useful life span of the chain is reduced.

The introduction of ceramic materials in specific parts of certain types of chains and chain conveyors has been generally proposed. For example, U.S. Pat. No. 5,069,331 discloses a harvester conveyor chain having composite links fitted with non-metallic overlay bushings. U.S. Pat. No. 4,911,681 discloses a ceramic conveyor belt formed of ceramic bars interconnected with ceramic spacers by ceramic rods with end fixation provided between the rods and bars, in which the bars are attached fixedly on the rods using ceramic end tabs whereby a projection in the bar fits within an end groove on the rods while leaving a space on the opposite side of the rod which is filled with ceramic putty to radially and axially fix the rods, precluding any freedom of rotation for the rods. The conveyor chains of the '331 and '681 patents concern non-articulated links of chains using rotatable pin connections. Additionally, conveyor chains, such as described in the '331 and '681 patents generally concern lower tensile load environments relative to the overall chain size involved such that longitudinal chain stretch problems are not a concern.

U.S. Pat. No. 5,829,850 discloses a track system for use in a tracked vehicle having a crawler chain and a driving sprocket wheel, which has a pin assembly with a bushing or one piece bolt the outer periphery of which is at least composed of a material consisting of silicon nitride or a zirconium oxide with at most 15% sintering additives. A track system with its relatively large dimensions of the chain components translates into a relatively low load environment without serious longitudinal chain stretch problems. U.S. Pat. No. 5,884,387 discloses a drive system having self-lubricating ceramic components, identified as center links, center rollers and sprockets. U.S. Pat. No. 5,803,852, like the '387 patent, discloses a drive system having ceramic center links, center rollers, and sprockets arranged for sliding and rotating contact. U.S. Pat. No. 4,704,098 discloses a combination link chain constructed of metallic outer link plates and plastic inner link plates.

There has been a need for drive chains to be used in high load and high speed environments such as automotive timing chain or other power transmission applications having better resistance to wear, corrosion, abrasion resistance, and longitudinal chain stretch or elongation, yet without incurring substantial sacrifices in chain performance and while being cost effective and practical from a manufacturing standpoint.

SUMMARY OF THE INVENTION

The invention herein described relates to construction of various power transmission chains which are suitable for automotive uses as well as other uses and which have a reduced susceptibility to wear, corrosion, and chain elongation, in which such chains are constructed to include a plurality of sets of links joined at overlapped ends thereof by a pivot including at least one ceramic joint component effective to reduce the longitudinal elongation of the chain. Such chains also include means to drivingly engage sprocket teeth of a sprocket drive.

In one aspect of this invention, the inclusion of the ceramic joint components in the chain in place of steel parts therefor reduces the chain elongation at least about 10% that otherwise would occur if the steel parts instead were present, and the reductions in elongations can increase up to about 25% or even higher, depending on the time period of service for the chain and the operation conditions. While experiencing less elongation, the chains made according to this invention nonetheless have service lives that are approximately comparable or even greater than those of chains of similar structure except made entirely of metal.

Such chains preferably are used for automotive timing or motion transferring procedures. These environments involve high loads. In one aspect, the present invention is based on the unexpected and surprising discovery that chain pivot means, such as chain pins, which are critical stress points in an articulated timing chain where severe radial, axial and longitudinal forces are all focused, can be made with ceramic material that will nonetheless withstand the rigorous tensile loads to which automotive timing and drive chains are subjected while significantly reducing chain stretch problems and corrosion, among other things. Silent chains used in automotive timing applications often are subjected to fluctuating loads during operation. Even though ceramic parts in the past have been viewed as a relatively brittle materials as compared to many common metals, the present investigators have determined that ceramic pivot means are not functionally compromised due to any embrittlement or cracking when used in automotive timing chains despite the high load environment. The use of ceramic joint means instead of steel joint means in the drive chains according to this invention reduces the chain's susceptibility to wear, corrosion and chain elongation, as demonstrated by experimental test results described herein. These benefits increase the overall life of the chain, and the reliability of the engine systems when using the inventive drive chain. For instance, by reducing the wear and corrosion of the chain, the chains of the present invention can reduce the chance for inadvertent changes in the timing between the crankshaft and the camshaft of an internal combustion engine.

Moreover, another potential advantage of the invention is that silent chain for automotive applications according to an aspect of the invention, which are assembled using ceramic joint pivot means to connect successive chain links in an articulated manner, are ready for use after assembly without the need to subject the assembled chain to prestress or preloading procedures otherwise commonly performed on steel timing chains before putting the chains into service. This advantage reduces the chain manufacturing and quality control costs and time.

In another aspect of the present invention, there is a power transmission chain and sprocket drive combination including a sprocket having sprocket teeth, and a chain including a plurality of sets of links operatively engaging the sprocket teeth. Pivots, which are formed at least in part by ceramic material, join successive sets of the links to permit articulation of each set of links relative to adjacent sets of links. The links preferably can be formed of metallic material, thereby forming a composite chain construction.

In an aspect of the invention more directly relating to silent chain constructions, a power transmission chain, which can drivingly engage a toothed sprocket drive, includes successive sets of links in which each link thereof includes at least two apertures, which are co-axially aligned with apertures of the remaining links of the same set of links as well as apertures of each of the links of a successive set of links. The pivot, which is formed at least in part of ceramic material, is fitted into the aligned apertures effective to connect the successive sets of links. In a further aspect of the invention, at least one link of each set is formed of at least two link plates in interfacial contact with each other. This aspect of stacking link plates makes it possible to provide stronger chain links, which are more resistant to deformation, especially at the aperture walls bearing against the pivot.

The pivot used in the silent chain aspects of this invention can be, for example, a rounded pin or rocker joints. These pivot components include ceramic material at least at their outer surfaces. The pivot component can be formed as a homogenous ceramic material throughout, or, alternatively, the pivot can be formed of a metallic substrate coated with a ceramic surface layer.

When the pivot comprises rocker joints in this regard, the rocker joints preferably include a long rocker pin and a short rocker pin, and the long rocker pin extends completely through an aperture to join one outermost link of a set of links to the opposite outermost link of the given set, and the short rocker pin extends partly, but not completely, through the same aperture, such that the long and short rocker pins in the aperture are operable to rock against each other. At least one of the rocker pins includes ceramic material as described above.

In another aspect of the invention, the power transmission chain, which can drivingly engage a toothed sprocket drive, is a roller chain construction, in which successive sets of links comprise a plurality of inner and outer links disposed alternately in tandem. The inner links include at least two inner plates having pairs of aligned apertures and pin bushings disposed between the respective pairs of aligned apertures, and the outer links including at least two outer plates joined together at opposite ends thereof by first and second pins in which the outer and inner links are articulately joined to each other by a first pin fitted to one end of one of an outer plates and projected through the pin holes at associated ends of the inner plates of a first adjacent inner link. This first pin joins an opposing end of the other outer plate of the same outer link. The other ends of the same outer plates are joined by a second pin projecting through the apertures of associated ends of the inner plates of a second adjacent inner link. A plurality of rollers, each of which surrounds an associated one of the pin bushings for loose rotation thereon and are disposed between the inner surfaces of the inner plates. In this aspect at least one of the pin bushings or the pins associated with each row of aligned apertures contains ceramic material at least at its surface.

The ceramic materials useful in this invention in the construction of the pivot or joint components of the chain, include, for example, zirconia, zirconia toughened alumina (ZTA), silicon nitride, aluminum nitride, silicon carbide, boron carbide, alumina, beryllia, sapphire, and combinations thereof. Mixtures of these ceramics with other modifiers can be used, such as stabilizers or toughening agents. In one aspect, the ceramic material comprises zirconia toughened with a rare earth oxide, such as yttria stabilized forms of zirconia (Y-TZP).

BRIEF DESCRIPTION OF THE DRAWINGS

The foregoing and other objects, aspects and advantages will be better understood from the following detailed description of the preferred embodiments of the invention with reference to the drawings, in which:

FIG. 1A is a plan view of a silent chain construction involving a pin chain design according to an aspect of the present invention;

FIG. 1B is a plan view of the silent chain construction of FIG. 1A further including a partial cross-sectional view;

FIG. 2A is a plan view of a silent chain construction involving a pin chain design according to another aspect of the present invention, and includes a partial hidden view;

FIG. 2B is a plan view of a silent chain construction involving a bushing style chain design according to another aspect of the present invention, and includes a partial hidden view;

FIG. 4 is a partial cut-out frontal view of a silent chain according to another aspect of the invention;

FIG. 5 is a plan view of the silent chain of FIG. 4;

FIG. 6A is a plan view, partially in cross section, of a pin bushing joint of a roller chain construction according to another aspect of the invention;

FIGS. 7A–7H are schematical illustrations of various retention techniques for assembling ceramic pins with chains according to further aspects of the invention;

Skilled artisans will appreciate that elements in the figures are illustrated for simplicity and clarity and have not necessarily been drawn to scale. Also, features in the various figures identified with the same reference numerals represent like features, unless indicated otherwise herein.

DETAILED DESCRIPTION OF THE PREFERRED EMBODIMENTS

Figure 3A:
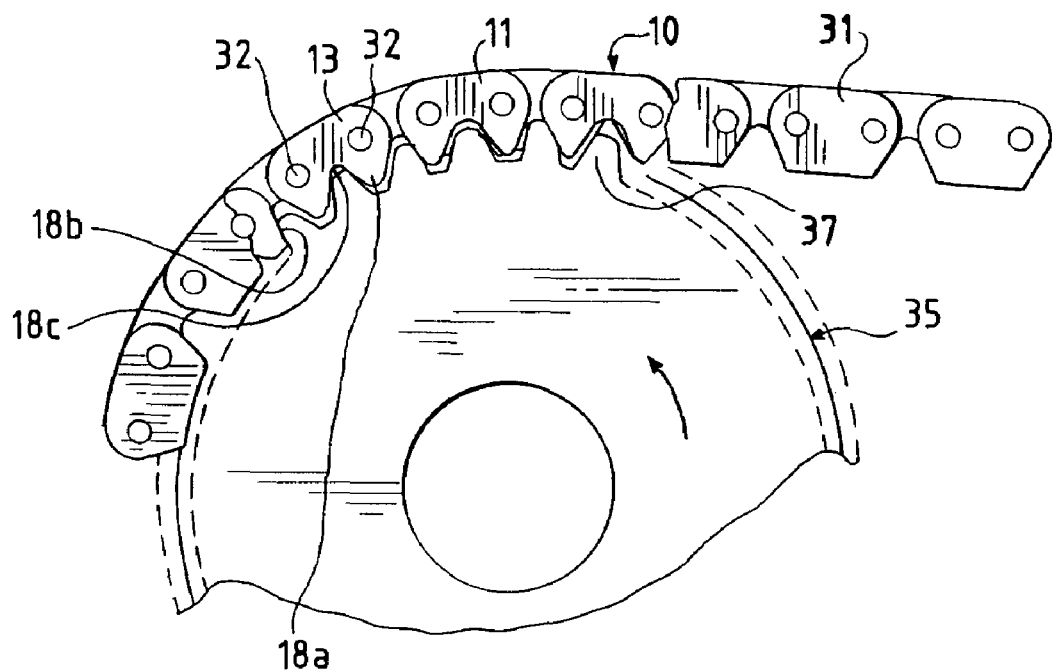
FIG. 3A is a schematic drawing of a representative portion of a chain and portion of a sprocket illustrating one arrangement for their operative engagement in combination, the chain having some parts broken away.

Referring now the figures, and FIG. 1A in particular, shows an arrangement of links 11, 13, in a chain construction 10 assembled as alternate, interleaved sets 12, 14, respectively. The alternate sets of links 11, 13 are joined by a pivot means 16 at overlapped ends (11a, 13a) thereof. Each of the links 11, 13 has a pair of spaced apertures 32 (e.g., as best seen in FIG. 3) to receive the pivot means 16. The longitudinal dimension of the links 11, 13 is oriented parallel to a line passing through the centers of both apertures 32 on any given link 11, 13. The individual chain links of this aspect and other aspects of the invention can be formed from a single plate or a plurality of plates that contact each other interfacially along their major surfaces.

As shown in FIG. 1B, the pivot means 16 can be a cylindrical shaped (rounded) pin, for example, which can be journaled and received into aligned sets of apertures 32 in successive sets 12, 14 of links 11, 13, respectively, to join them. The links 11, 13 are press-fit on pins 16 such that no relative motion occurs between the pins 16 and the connecting links 11. Relative rotation occurs between the articulating links 13 and the pins 16. In this manner, the pins 16 connect alternates sets 12, 14 or groups of links 11, 13 so as to permit articulation of the chain 10 about the pivot means 16. Each round pin 16 rides in the transversely aligned round shaped apertures 32 at overlapped ends of links 11 and 13. The ceramic pin 16 rotates directly against the links 11 and 13, and the bearing is formed by the outer surface of the pin 16 and inside surface of the link aperture(s) 32.

In a further optional aspect, the sets 12 of links 11 could include guide links 31 (as best seen in FIG. 3), as the transversely outer links of one or more of those sets, which would flank the outside of the chain, while the transversely interior link or links 11 of the sets 12 would serve as the connecting link(s). The guide links 31, when provided, do not have driving engagement with sprocket teeth, and they are used to maintain the lateral alignment of the chain 10 on the sprockets of a sprocket wheel. The transverse direction of the chain and components thereof is oriented parallel to the longitudinal axes of pivot means 16. An inside guide link (no shown, but known in the art) may optionally be used in which case the sprocket is grooved to receive the guide links.

FIG. 2A is a plan view of a silent chain construction 10' according to an alternate aspect of the present invention in which the inner links 14 are stacked in direct interfacial contact with each other without being interleaved with the second set of links 12. The inner links 14 and outer links are united with ceramic pins 16 that pass through aligned apertures at each longitudinal end of the links.

As illustrated in FIG. 2B, the pin chain design illustrated in FIGS. 1A alternatively could be a bushing style chain 10" including a ceramic pin 16, and a crescent shaped bushing 17. The pin 16 rotates against the crescent shaped bushing 17. The bushing 17 is restrained from moving in the link aperture 32', and the bearing is formed by the outer surface of the pin 16 and the inside surface of the bushing 17. The bushing 17 may also be constructed of a ceramic material. The bushing style chain 10" can have either a butt link (which prevents backbending), or buttless design (which permits free backbending), depending generally on whether backbending will be required such as when a chain tensioner or idler will be used.

Referring now to FIG. 3A, a portion of a sprocket-drive chain combination comprising a sprocket 35, and an inverted tooth silent chain 10 such as described above in connection with FIGS. 1A and 1B. The sprocket 35 has a plurality of spaced teeth 37 which engage the chain links 11, 13. Each of the links 13, and at least the transversely interior links 11, are defined by a pair of toes defined by convexly curved inner flanks 18a and outside flanks 18b, in which the inner flanks 18a are joined at a crotch 18c. In the situation of a silent chain arrangement, such as for an engine timing application, the inner flanks 18a drivingly engage the sprocket teeth 37.

Figure 3B:
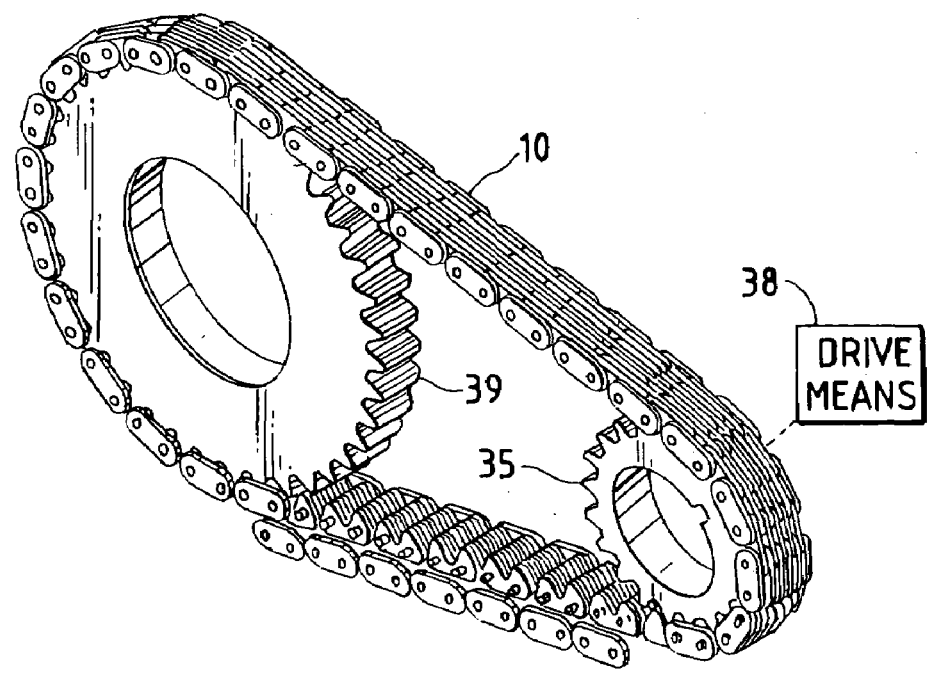
FIG. 3B is a schematic drawing of the chain of FIG. 3A, and drive and driven sprockets associated therewith in an aspect of the invention.

FIG. 3B shows the chain 10 of FIG. 3A as operably engaged with a driving sprocket 35 and driven sprocket 39 of a timing chain system of an engine. A drive means 38, such as an engine motor, is used to impart rotation to sprocket 35. A drive means alternatively could be used to drive sprocket 39. As will be appreciated, the particular chain layout that the chain will take in an implementation, such as from the crankshaft up to the camshaft and back to the crankshaft, will be influenced by the layout of the engine, the number of camshafts to be driven, the number of valves per cylinder, and whether any accessories will be driven by the chain. The selection and use of chain tensioners and snubbers in conjunction with the timing chains and timing chain systems of this invention also can be provided, if desired or necessary.

An important aspect of the invention resides in that the pivot 16 includes ceramic material. The term "ceramic material" relates to nonmetallic mineral-containing material, which can be formed into a desired configuration by shaping and heating. The ceramic material is provided at least on its outer exposed surface areas of the pivot, which can come into contact with the other components of the chain. For instance, the ceramic surface on the pivot will contact the walls defining the openings or apertures formed in the links, through which the pivot is received. The ceramic surface material preferably is a hard yet smooth surface. This provides a pseudo-"self-lubricating" surface that is less susceptible to physical wear arising from physical contact between the surfaces of the link apertures into which the pivot is journaled and fitted. The pivot containing ceramic material at least at its outer exposed surface also is chemically inert, making it non-corrosive.

To accomplish this, the pivot, for example, can be fabricated as a cylindrical pin comprised essentially of ceramic material throughout. In a preferred aspect, the pin is a homogenous ceramic construction.

In one aspect, the ceramic material used to form the ceramic pins described herein can be selected from the group consisting of zirconia, alumina, silicon nitride, aluminum nitride, silicon carbide, boron carbide, beryllia, sapphire, and combinations thereof. In one aspect, the ceramic material is a composite or modified ceramic material.

In one particular aspect, ceramic composite materials such as ZTA are used. The zirconia contained in the ZTA is generally lower than about 40 wt %, and preferably less than 25 wt %. Preferably, the zirconia is uniformly distributed throughout the alumina. The ZTA can be prepared by physically blending powders of alumina and zirconia, followed by heat-pressing or green-machining, sintering and polishing. The alumina powder and the zirconia powder can both be commercially obtained.

Alternatively, the ZTA can be prepared in situ by precipitation from solutions by using polyelectrolytes by techniques known in the art, such as described in U.S. Pat. Nos. 5,002,909 and 5,032,555, which descriptions are incorporated herein by reference.

The ceramic material generally will be formulated or synthesized as applicable, heat-pressed or green-machined, sintered and polished to make the desired pin shape. Preferably, ZTA having a morphology characterized by high density and small grain size is provided as the ceramic material to yield mechanical properties well suited for pin applications. ZTA having high hardness, toughness and fracture strength is provided and used in the ceramic pins in this manner. The ZTA used also is a material conducive and reliable for mass production schemes.

In another particular aspect, the ceramic pin material is obtained as a zirconia base ceramic material or base composite ceramic material that is modified by incorporation of a stabilizer, a toughening agent, and the like. One important function of a toughening agent or stabilizer as used in combination with a zirconia base material is increasing the metastability of the tetragonal phase of the zirconia. As generally known, zirconia is predisposed to transform from a tetragonal crystal structure to a monoclinic crystal structure during cooling after sintering or annealing. Tetragonal grains of zirconia increase the fracture toughness of the ceramic material. This has been attributed to a "stress-absorber"-like effect in which the stress forces adjacent a microcrack in a ceramic containing tetragonal zirconia are thought to be "absorbed" effective to transform the tetragonal zirconia to its monoclinic form, thereby increasing the energy needed for a microcrack to propagate through the ceramic material. The addition of stabilizing oxides, also often referred to as toughening agents, such as yttria, increase the retention of tetragonal crystal structure content in a cooled ceramic. On the other hand, the amount of toughening agent must be maintained below an amount that would produce cubic zirconia.

The stabilizers or toughening agents are added in an amount effective to promote retention of the metastable tetragonal crystalline structure. Non-limiting examples of the toughening agents include: yttria ($Y_2O_3$), ceria ($CeO_2$), $La_2O_3$, $Er_2O_3$, MgO, CaO, $Ta_2O_5$, $Nb_2O_5$, $HfO_2$, and the like. Toughened zirconia ceramics that can be used in the practice of this invention include, for example, stabilized and partially stabilized forms of zirconia, such as yttria-stabilized tetragonal zirconia polycrystals (YTZP), yttria-partially stabilized zirconia (YPSZ), ceria-stabilized tetragonal zirconia polycrystals (CeTZP), magnesium oxide-stabilized TZP, scandium oxide-stabilized TZP, lanthanide oxide-stabilized TZP, indium oxide-stabilized TZP, and the like. The ceramic material also can be a cerium-stabilized, alumina-toughened zirconia (CeATZ), and so forth. The ceramic material also can be a toughened composite ceramic such as a two-phase composite of alumina ($Al_2O_3$)/zirconia ($ZrO_2$) toughened by incorporation of a rare earth oxide in the zirconia, such as those described in U.S. Pat. No. 4,316,964, which descriptions are incorporated herein by reference.

For purposes of the chain pin and pivot implementations described herein, the ceramic material preferably should have a smooth surface to afford the self-lubricating property. The cylindrical metal core, where used as a substrate for a ceramic coating, can be selected from conventional metal pin materials used in power transmission chain joints. Examples of techniques for producing the ceramic joint parts useful in the chains according to this invention are described in greater detail later herein. In general, it must be possible to shape a preform containing ceramic material into the appropriate shape of the intended chain joint component, and then the preform must susceptible to firing or sintering to render permanent the imparted shape and provide a hard yet smooth-surfaced solid object.

By using the ceramic pivots in the silent chain constructions of one aspect of the present invention, it becomes possible to form at least one of the links 11, 13 of the sets 12, 14, as stacks of link plates in which at least two link plates are provided in interfacial contact with each other to provide a single link 11, 13. This proviso provides stronger links that better resist deformation as the aperture walls bear against the pins. Also due to the self-lubricating attributes of the smooth ceramic surfaces provided on pivot means 16, the need for chain lubricants and greases can be reduced or possibly even eliminated.

In another aspect of this invention, a silent chain construction of this invention includes rocker joints formed at least in part by ceramic material as the pivot means. Referring now to FIGS. 4 and 5, a silent chain 40 is assembled as alternate, interleaved sets 41, 47, respectively. The alternate sets of links 41, 47 are joined by rocker joints 43 as the pivot means 43. These rocker joints 43 include components formed at least in part of ceramic material. A plurality of articulating links 42 are arranged in sets 41. Each link 42 has a pair of toes 48 and apertures 45, generally similar to links 13 as described above in connection with FIGS. 1–3. The sets 41 of articulating links 42 are interleaved with sets 47 of interconnecting links 46 such that the respective apertures 45 of the overlapped ends 41a and 47a of link sets 41 and 47 are aligned. Relative rotation between the articulating links 42 and the rocking joints 43 occurs, while rocking joints 43 are press-fit through the apertures 45, such that no relative motion occurs between the rocker joints 43 and the connecting links 46. In this manner, the rocker joints 43 connect alternates sets (41, 47) or groups of links (42, 46) so as to permit articulation of the chain 40 about the pivot means 43. Also, guide links 49 can optionally be used in lieu of one or more pairs of the transversely outermost connecting links 46, similar to guide links 31 as described above for chain 10.

Referring to FIG. 5, the rocker joints 43 include short rocker pin 43A (or "rocker") and a long rocker pin 43B. In a preferred embodiment, the short rocker pin 43A is formed of homogenous ceramic material, while the long rocker pin 43B is a metal pin. In this way, the long rocker pin 43B can be easily fastened at its end to the chain, such as by standard riveting techniques. Long rocker pin 43B extends completely through an aperture 45 to join one outermost connecting link 46 to the opposite outermost connecting link 46 of a given set 47, and the short rocker pin or rocker 43A extends partly, but not completely, through the same aperture 45, such that the long rocker pins 43B and short rocker pins 43A in the aperture 45 are operable to rock against each other. As shown in FIG. 4, each rocker pin 43A and 43B has a convex arc surface, which face each other within each common aperture. The radius of curvature of the rocker surface is defined by the convex arc surface of each rocker pin (43A, 43B).

The short rocker pin 43A and/or the long rocker pin 43B can comprise a ceramic material. The rocker pins 43A and 43B can be formed of ceramic material essentially throughout the pin. For instance, the rocker pin 43 can be a homogenous ceramic construction. Alternatively, the rocker pin(s) 43A and 43B can be formed as a rocker including a metal core and an essentially continuous ceramic outer layer thereon.

The ceramic surface of the rocker pin(s) preferably is a hard yet smooth surface. This provides the pseudo-self-lubricating property. The useful ceramic materials for this aspect involving rocker joint constructions includes the ceramic materials such as described above as well as silicon nitride ($Si_3N_4$).

A silent chain may utilize a ceramic rocker combined with a steel pin where it is desireable to apply a preload to the chain to enhance its performance. Normally, the highest shear and bending load occurs just inside the guide link in the pin at the end of the mating rocker. The rocker, which is normally steel, can be replaced by a ceramic element since it is supported its full length by the steel pin upon which it bears.

However, a if the steel pin were replaced by a ceramic pin, the high shear and bending stress could cause the ceramic pin to fail during the preload operation. In this way, a rocker chain can be constructed that benefits from the hardness, smoothness and corrosion resistance of a ceramic rocker element and still retain the benefits of preloading the chain before it is placed in service.

In a rocker pin chain construction, the pins are typically press-fitted into the guide links of the chain. This forms a rigid unit holding the pins tightly in place. The inside links that bear against the pins in the guide row do not articulate against the pins. As the tension in the chain cycles between a high level to a low level as the chain runs from the tight strand to the slack strand, the inside links bear against the pins with a greater load. However, they do not articulate against the pins. This low relative motion results in proportionately low wear in this section of the chain.

However, in the non-guide section of the chain, the rockers are not press-fitted into guide links. The inside links in the non guide row are also a loose fit on the rockers. Thus, as the chain runs around the sprockets, the rockers articulate against the pins and rockers try and twist inside the inside link apertures. The result is that wear can occur between the pin and rocker wearing face as well as between the rockers and the inside link apertures in which they are assembled. This wear allows the length of the chain to increase through wear or "stretch" as it is known to laymen. By replacing only the steel rocker with a ceramic rocker, the most highly prone area of wear in the chain is substantially reinforced while still allowing for riveting of the pins and preloading of the chain.

When used as a timing chain or other power transmission application, this silent chain 40 including a ceramic component or components in a rocker joint (43) can be mounted on a sprocket drive (35) such as in a similar manner as described for chain 10 in FIG. 3.

It is considered a surprising discovery of this invention that silent chains can be made and successfully put into service in which the chains are constructed with rocker joints comprise parts made at least in part of a ceramic material. Rocker joints are highly dynamic pivot joints, yet it has been determined that these types of joints can accommodate and perform adequately in automotive timing and other power transmission applications when made of ceramic construction. Moreover, the silent chains constructed with rocker joints including ceramic material have been found not to require preload treatment to anticipate any chain length variations during service. The ceramic rocker joints not only function as intended insofar as being a rocker joint for a chain, but the chains including such joints also have been determined to be less susceptible to length variation during service, which is thought to be at least in part attributable to the use of the ceramic rocker joint components. The chain length variation is curbed sufficiently that a preload procedure for the assembled silent chains can be omitted. The ability to omit a chain preloading procedure on the newly assembled chain, as made possible by this aspect of the invention, also reduces risk of cracks or local deformations from occurring in the rocker pins on account of any excessive surface pressure generated on the surface of the rocker pins.

Referring now to FIG. 6A, another aspect of the invention is illustrated in which a roller chain 60 incorporates joint components including ceramic material. Successive sets of links comprise a plurality of inner links 63 and outer links 67 disposed alternately in tandem. The inner links 63 including at least two inner plates 63a, 63b having pairs of aligned apertures 68 and pin bushings 66 disposed between the respective pairs of aligned apertures of the inner plates 63a, 63b. The outer links 67 including at least two outer plates 67a, 67b joined together at opposite longitudinal ends 67c, 67d and 67e, 67f thereof by first and second pins 61A, 61B, respectively. The pin bushings 66 are preferably press-fit into aligned apertures 68 of adjacent but spaced apart ends 63c and 63d of inner plates 63a, 63b, respectively. The pin bushings 66 are freely rotatable on the pins 61A, 61B. The bushings 66 preferably wrap completely around the circumference of pins 61A, 61B.

Still referring to FIG. 6A, the outer links 67 and inner links 63 are articulately joined to each other by the first pin 61A fitted to one end 67c of one of the outer plates 67a, 67b and projected through the pin apertures 68 at associated ends 63c, 63d of the inner plates 63a, 63b of the adjacent inner link 63, and then the first pin 61A joins an aligned end 67c of the other outer plate 67b of the same outer link 67. The other longitudinal ends 67e, 67f of the outer plates 67a and 67b are joined by a second pin 61B which projects through pin holes 68' of associated ends 63g, 63h of inner plates 63e, 63f of a second adjacent inner link 63'. Pins 61A, 61B also are rotatable with the inner and outer plates journaled thereon. A plurality of rollers 69 are provided, wherein each roller 69 surrounds an associated one of said pin bushings 66 for loose rotation thereon and the roller 69 is disposed between the inner surfaces of the inner plates 63a, 63b. The rollers 69 drivingly engage the sprocket teeth 37 of a sprocket 35.

For purposes of this aspect of the invention, the roller chains could be ANSI (American National Standards Institute) roller chain or British roller chain configurations, among others. It also will be appreciated that this embodiment also can encompass so-called roller-less chains in which the bushings 66 are provided with thicker walled thicknesses, and the thick-walled bushings engage the sprockets instead of separate bushings and rollers.

The pin and/or bushings can comprise ceramic material in this roller chain aspect of the invention. Wear is reduced at the chain joints due to the use of the ceramic parts in lieu of at least part of the conventional steel joint components. The ceramic materials that are useful for this aspect are similar to those described above.

Figure 6B:
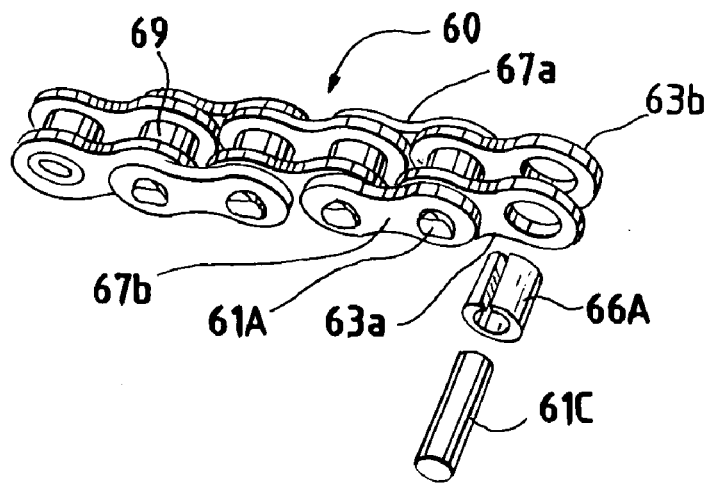
FIG. 6B is perspective view of the roller chain of FIG. 6A including a partial exploded view of a pin and bushing thereof.
Figure 6C:
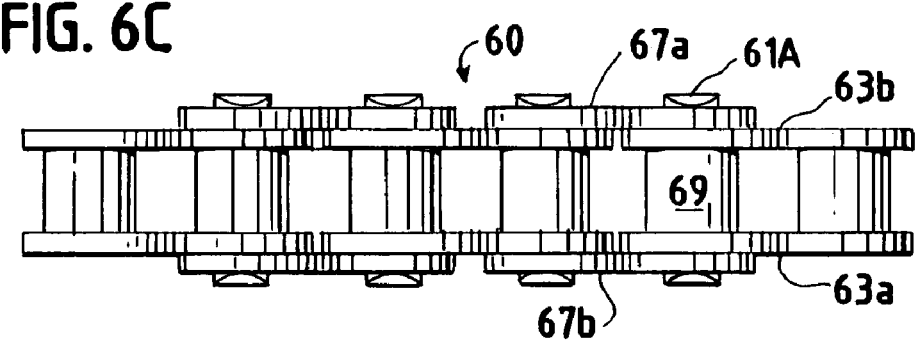
FIG. 6C is a plan view of the roller chain of FIG. 6A.
Figure 6D:
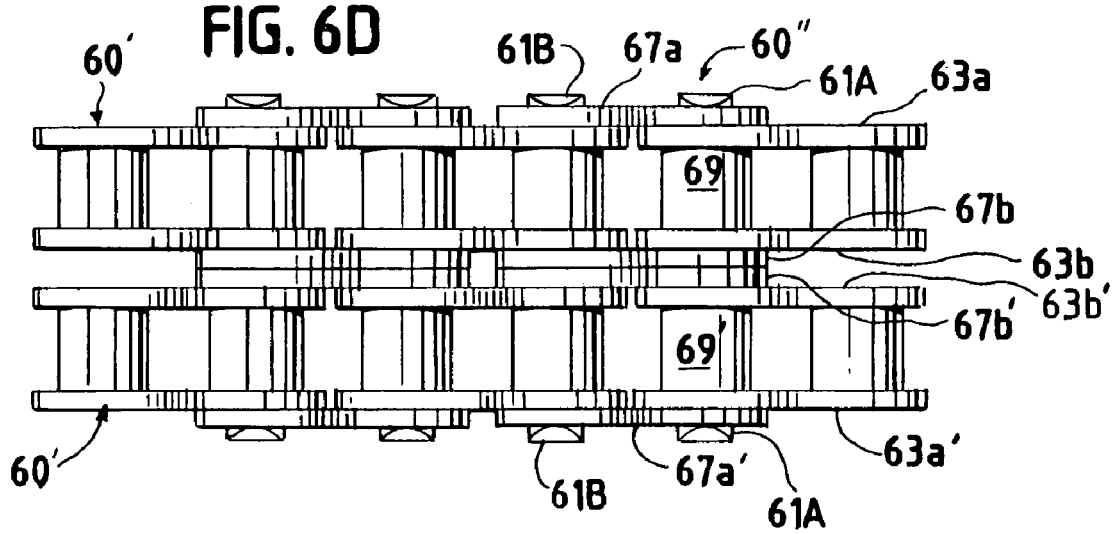
FIG. 6D is a plan view of an alternate configuration of roller chain according to another aspect of the invention.

FIG. 6B is perspective view of the roller chain 60 of FIG. 6A including a partial exploded view of a ceramic pin 61C and bushing 66A thereof. For this illustration, pins 61A and 61C are made similarly. FIG. 6C is a plan view of the roller chain of FIGS. 6A and 6B. FIG. 6D is a plan view of a alternate configuration of a roller chain 60" according to another aspect of the invention in which the chain is transversely widened. The chain 60" is effectively made wider by inserting the ceramic pins (e.g., ceramic pin 61A) through aligned apertures in the inner links 63a, 63b and outer links 67a, 67b of one chain strand 60 and concurrently through the aligned apertures in inner links 63a', 63b' and outer links 67a', 67b' of an adjoining chain strand 60'. As shown in FIG. 6D, outer links 67b and 67b' of the adjacent strands are put in interfacial contact at their respective outer surfaces, and then pinned together in a way permitting articulation of the integral chain 60". Otherwise, the assembly of parts in the chain 60" is similar to that described herein relative to narrower chain 60.

FIGS. 7A–7H illustrate different non-limiting retention techniques that can be used to assemble ceramic pins with chain strands comprised of metal links to implement the above and other embodiments of the present invention. In FIG. 7A, outside guide links 71 and 74 are press fit onto ceramic pins 75 and 76 which have been inserted through aligned apertures 77 and 78 in the outer links 71 and 74 and inner links 72 and 73 of chain 70. For purposes of these illustrations of FIGS. 7A–7H, links 71–74 are metal links, such as steel links. Alternatively, adhesives can be used to lock the pins 75 and 76 to the guides 71 and 74. For instance, two part adhesives, such as epoxies, can be applied to the ends of the pins 75 and 76 and/or aperture areas 77 and 78 of the outside guide links 71 and 74, and the adhesive is activated by pressure, heat, light, etc., for curing as the outside guides 71 and 74 are pressed onto the pins 75 and 76. These retention techniques eliminate the need for riveting, which may not be well tolerated by ceramic pins. In an alternative arrangement as illustrated in FIG. 7B, a star washer or similar pressed retainer means can be pressed over the pin 75 and is held in a circumferential groove 702 that has been previously formed during molding of the preform of pin 71. In FIG. 7C, a "C" clip 702 or similar means is slid into the pin groove 702. In FIG. 7D, a ceramic cap 703 is adhesively bonded to an end of the ceramic pin 75 that is exposed through an aperture in outside guide link 71, in which the ceramic cap 703 includes a stem 704 that is inserted into an accommodating hole molded 705 into the end of ceramic pin 75 to mechanically enhance the retention. The adhesive used can be any conventionally known or other suitable adhesive for bonding ceramic material to steel, such as epoxies. In FIGS. 7E and 7F, a grooved ceramic pin 75 is illustrated both before and after an orbital forming technique is utilized to displace metallic material 706 from the outside guide link 71 into the pin groove 702. In FIG. 7G, a high energy source, such as a laser, electron beam and so forth, is used to displace metal material 707 from the guide link 71 into groove 702 preformed in ceramic pin 75. The high energy source is tuned so that it does not effect the ceramic pin material. In FIG. 7H, a ceramic pin 708 is preformed having an integral head 709 at one end, which, after assembly with the metal chain links 71–74 without use of press fit guide links, has a ceramic cap 703 fitted to the opposite exposed end, such as using the arrangement illustrated in FIG. 7D, and the cap is bonded in place using a suitable adhesive, such as an epoxy.

Techniques useful for forming the ceramic joint components of the chains of the present invention include the following procedures.

One general technique for making the ceramic joint components of the chains includes the steps of compounding a mixture a ceramic powder and a temporary binder; pressing, injection molding, or extruding, and the like, the powder/binder mixture to form the desired part shape; optional machining of the shaped green part; sintering the shaped "green" part at high temperature to form a densified, solid ceramic product; and optional final precision machining of the sintered ceramic component. For example, the green parts can be HIPed (hot isostatic pressed) to form a densified, solid cylindrical shaped ceramic product of sizes appropriate for uses as a chain pin, pivot or rocker pin, and the like.

In compounding the ceramic powder, a ceramic alloy or mixtures of different ceramic materials can be used. For instance, a tetragonal zirconia alloy can be used, which is commercially available and manufactured by alloying zirconia ($ZrO_2$) with a number of secondary oxides as generally known in the art. Alternatively, a mixture of different ceramics could be used, such as a mixture of zirconia and alumina ($Al_2O_3$). For instance, the mixture of ceramics powders could include about 60 to 99 wt % zirconia and about 1 to 40 wt % alumina. Next, the ceramic powder or mixture thereof is compacted in the presence of an organic binder. The organic binder could be polyvinyl alcohol, paraffin, or a polyalkylene polyol such as polyethylene glycol. The binder must be a fluid at the processing temperatures used for mixing of the binder and the ceramic powder, and the subsequent shaping procedure. The mixing of the ceramic powder and binder can be done, for example, by ball milling or spray drying.

The ceramic powder/binder mixture is then shaped into an approximate final shape desired. This can be done in a number of different ways, including dry pressing, ram pressing, cold isostatic pressing, injection molding, cold extrusion, and the like. After compaction and shaping, the green components can be green (pre-fire) machined, if necessary to make the dimensions of the green components approximately the final desired shape, using suitable equipment such as carbide machining tools known in the art. The green components are then sintered to form a hardened dense ceramic part. Sintering can be performed by any convenient technique, such as high temperature anneals, microwave sintering, and so forth. The sintering procedure effectively eliminates the higher volatility ingredients such as the organic binder. High temperature sintering of the ceramic parts generally can be done in a temperature range of about 1300° C. to 1700° C. for about one to three hours. In addition, final precision machining, if required, is done after sintering, such as using diamond machining tools, laser machining, or lapping/polishing techniques known in the art, to ensure the dimensions of the finished ceramic joint parts are within narrow tolerances to ensure smooth running and performance of the chain.

In an alternative technique of making the ceramic joint components of the chains, steel or other metallic chain joint parts can be used as a substrate, which have essentially the needed dimensions for usage or slightly less thereon, upon which a ceramic coating is applied in a coating thickness to provide the ultimate dimensions for usage. The ceramic coating can be applied by thermally spraying a powdered mixture directly upon the metal substrate using a thermal spray gun. Preferably, the metal surface is roughened, such as by grit blasting using fine abrasive particles, prior to applying the ceramic coating to improve the adhesion of the coating to the metal surface. Thermal spraying can be performed by means of a combustion flame, e.g., an oxyacetylene flame, at a standoff distance of at least about 3–6 inches and at a traverse speed in the range of about 25 feet to 75 feet per minute. The ceramic material must be selected as one that does not burn up excessively in the flame. Alumina is a useful ceramic material, for example. Also, the adhesion of the ceramic coating to the metal substrate can be enhanced by including powdered metallics blended uniformly with the ceramic powder. A small proportion of fumed silica can also be included as a flow agent. Also, electrically energized plasma spraying could be used in lieu of thermal spraying to apply the ceramic coating to the metallic substrate.

The Example that follows is intended to illustrate, and not to limit, the invention. All percentages used herein are by weight, unless otherwise indicated.

EXAMPLE

To investigate the effect of using ceramic pins in a silent chain construction as compared to the use of steel pins in the otherwise same chain construction, the following experiment was conducted. The type of chain construction used for the silent chains tested were 82 links, 0.25 inch×102 pitches×⅝ lacing.

Figure 8:
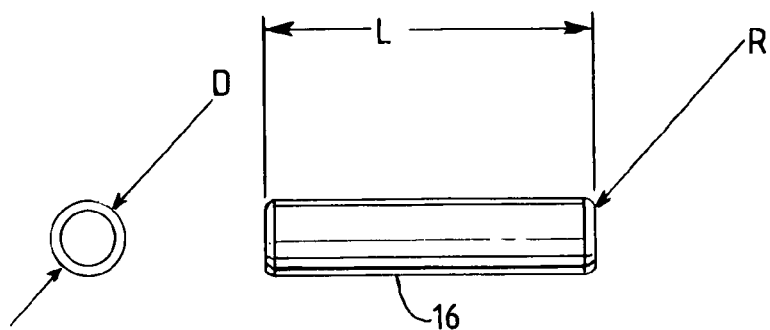
FIG. 8 is a schematical illustration of a ceramic pin used in chain performance tests described in the example herein.

The ceramic pins used in test chains representative of the invention were formed as HIPedY-TZP zirconia. The ceramic pins, also referred to as "rollers," were generally cylindrically shaped having chamfered ends, as illustrated in FIG. 8. The ceramic pins has dimensions of 0.465 inch (11.81 mm) length (L), 0.1068 inch (2.71 mm) diameters (D), and chamfered opposite ends (0.015 inch (0.38 mm)) (R). The ceramic pins had smooth surface finish properties including an Ra value of 5 microns and an Rz value of 0.5 microns. The ceramic pins had a harness of 13.5 GPa; a specific gravity of 6.08 g/cm$^3$; an elastic modulus of 220 GPa; a flexure strength (4 point bend) of 1400 MPa; and a grain size of <0.5 μm. The formulation of the tested ceramic pins is summarized in Table 1 below.

TABLE 1

| Ceramic Component(s) | wt % |
|---|---|
| $ZrO_2$ + $HfO_2$ + $Y_2O_3$ | >99.5 |
| $Y_2O_3$ | 5.05–5.25 |
| $SiO_2$ | <0.02 |
| $Al_2O_3$ | <0.10 |
| $Fe_2O_3$ | <0.01 |
| $Na_2O$ | <0.04 |

The remainder of the chain parts of the chains tested that represented the invention, other than the ceramic pins, were formed of steel. The steel pins and chain link parts used in the comparative chains were steel.

Each test chain was tested by fitting it to a motorized test stand using oil deliberately contaminated with soot to replicate used diesel engine oil. The test stand was used to impose a constant load on the silent chains over a given period of time. The % Center Distance Elongation was measured for each test chain after a series of different running times for the chain on the test stand using a measuring machine equipped with an Acu-Rite III digital readout system.

The % center distance elongation of the tested chains was periodically measured. For all these test runs, the input speed was 3250; the chain tension was 100 lb with both chains strands maintained taut during the test runs; the driver sprocket contained 42 teeth and the driven sprocket contained 21 teeth. The lubricating oil used for these experiments was 5W30 weight oil. The soot level in the lubricating oil was formulated to be either 0.25 wt % or 1.0 wt %. The test conditions and results are summarized in Table 2.

TABLE 2

| Run | Pin type | % soot in oil | % Center Distance Elongation Test Hours | | | | | |
|---|---|---|---|---|---|---|---|---|
| | | | 0 | 10 | 25 | 50 | 75 | 100 |
| 1 | ceramic | 0.25 | 0.000 | 0.048 | 0.070 | 0.097 | 0.104 | 0.148 |
| A | steel | 0.25 | 0.000 | 0.065 | 0.096 | 0.131 | 0.161 | 0.184 |
| 2 | ceramic | 1.00 | 0.000 | 0.067 | 0.115 | 0.183 | 0.238 | 0.296 |
| B | steel | 1.00 | 0.000 | 0.082 | 0.169 | 0.275 | 0.356 | 0.430 |

Figure 9:
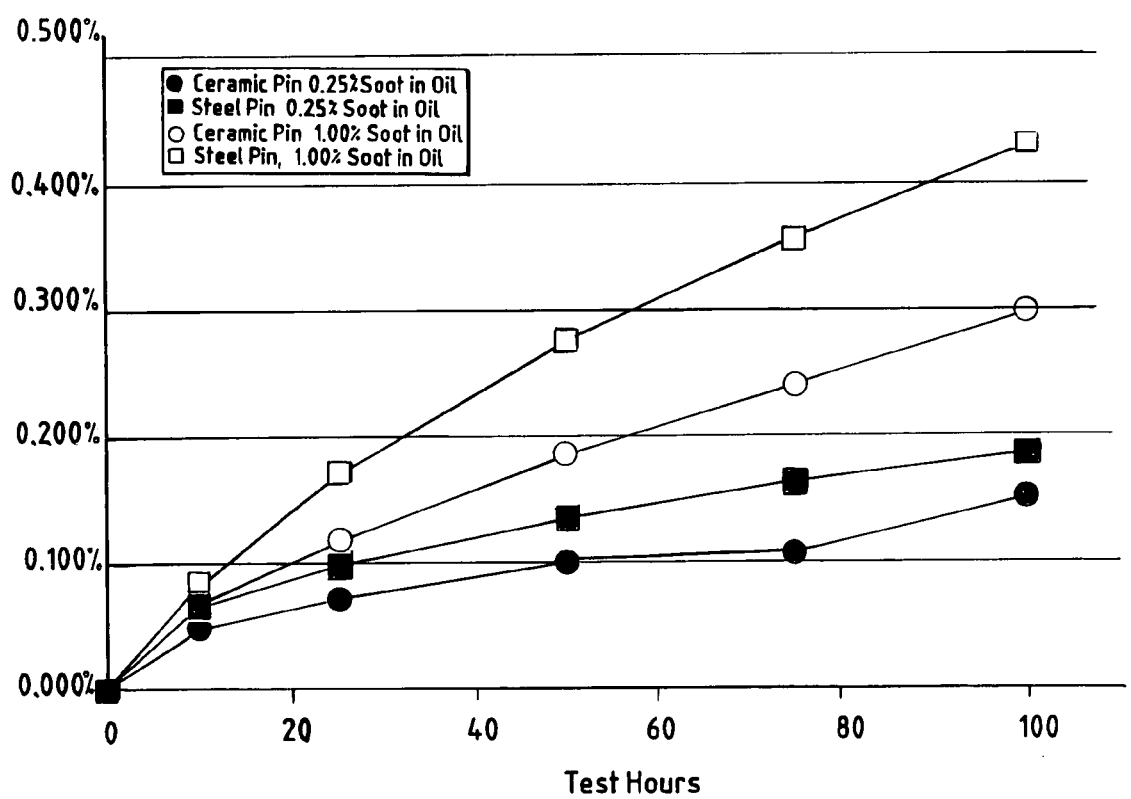
FIG. 9 is a graph of % center distance elongation values measured over a period of test hours for silent chains tested at two different oil soot levels, as described in the Example herein, comparing a silent chain assembled with ceramic pins according to the invention versus comparative chains instead having steel pins.

The results of these experiments also are plotted in the graph illustrated in FIG. 9.

As apparent from the results that are shown in FIG. 9, the % center distance elongation values measured over the test period for the silent chains assembled with ceramic pins according to the invention were significantly superior and improved (i.e., reduced in value) over the silent chains assembled with steel pins, and this significant improvement of the silent chains of the present invention was achieved at two different oil soot conditions.

In the foregoing specification, the invention has been described with reference to specific illustrative embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. An automotive power transmission chain and sprocket drive subject to fluctuating loads, comprising:
a drive sprocket having sprocket teeth, and
a chain operable over a range of speeds and the drive sprocket is effective for putting the chain under a tension of at least 100 pounds at 3250 rpm, the chain comprised of a plurality of sets of links operatively engaging said sprocket teeth, and pivots joining successive sets of the links to permit articulation of each set of links relative to adjacent sets of links, the pivots comprise ceramic material effective to reduce the elongation of the chain by at least about 10% relative to the elongation of the chain with steel pivots when the chains are subjected to a tension of 100 pounds for ten hours at 3250 rpm, and the ceramic material is selected from the group consisting of toughened alumina, alumina/zirconia composites, alumina/zirconia composites incorporating a rare earth oxide, composites having a metastable tetragonal zirconia crystal content, stabilized zirconia, beryllia, sapphire, and combinations thereof.

2. The automotive power transmission chain and sprocket drive as recited in claim 1, wherein each link of the successive sets of links includes at least two apertures in which each aperture is co-axially aligned with apertures of the remaining links of the same set and apertures of each of the links of a successive set of links, and a pivot fitted into the aligned apertures effective to connect the successive sets of links.

3. The automotive power transmission chain and sprocket drive as recited in claim 2, wherein at least one link of each set comprises at least two link plates in interfacial contact with each other.

4. The automotive power transmission chain and sprocket drive as recited in claim 2, wherein the pivot comprises a curved pin of the ceramic material.

5. The automotive power transmission chain and sprocket drive as recited in claim 2, wherein the pivots comprises outer link plates, inner link plates, and rocker joints containing the ceramic material, the rocker joints including a long rocker pin and a short rocker pin, and the long rocker pin extending completely through an aperture of an outer link plate to join one outermost link plate to an opposite outermost link plate of a given set, and the short rocker pin extending partly, but not completely, through an aperture of the outermost inside link plates in an adjacent row of inner link plates, such that the short rocker pin and long rocker pin in the aperture are operable to rock against each other.

6. The automotive power transmission chain and sprocket drive as recited in claim 5, wherein the short rocker pin comprises the ceramic material.

7. The automotive power transmission chain and sprocket drive as recited in claim 5, wherein the short rocker pin comprises the ceramic material, and the long rocker pin comprises a metallic material.

8. The automotive power transmission chain and sprocket drive as recited in claim 5, wherein the ceramic material comprises silicon nitride.

9. The automotive power transmission chain and sprocket drive as recited in claim 1, wherein the ceramic material comprises zirconia toughened alumina.

10. The automotive power transmission chain and sprocket drive as recited in claim 1, wherein the successive sets of links comprise a plurality of inner link plates and outer link plates disposed alternately in tandem, the inner link plates including at least two inner plates having pairs of first and second aligned apertures with pin bushings disposed between the pairs of first and the pain of second aligned apertures, and the outer link plates including at least two outer plates having first and second apertures, the outer plates disposed such that their first apertures overlap and align with the second apertures of one pair of inner plates and the outer plate second apertures overlap and align with the first apertures of a successive, second pair of inner plates; the pivots formed a first pin projecting through said aligned first outer plate and second inner plate apertures and a second pin projecting through said aligned second outer plate and first inner plate apertures; and a plurality of rollers, each roller surrounding one of said pin bushings for loose rotation thereon.

11. The automotive power transmission chain and sprocket drive as recited in claim 1, wherein each link of the successive sets of links comprises at least two opposing, metallic link plates, each guide link plate having at least one aperture co-axially aligned with a corresponding aperture of the opposing guide link plate, and the pivot includes a cylindrical pin of said ceramic material spanning the distance between the guide plates, the ends of the ceramic pin fixed in opposing guide link plate apertures.

12. The automotive power transmission chain and sprocket drive as recited in claim 11, wherein the ends of the ceramic pin are fixed in the guide link plate apertures with an adhesive effective to bond ceramic to metal surfaces.

13. The automotive power transmission chain and sprocket drive as recited in claim 11, wherein each end of the ceramic pin is provided with a groove in the pin surface, the pin ends protrude through the guide link plate apertures and are maintained in the aperture with a retaining clement engaged in the groove.

14. The automotive power transmission chain and sprocket drive as recited in claim 11, wherein the ends of the ceramic pin protrude through the guide link plate apertures and are maintained in the aperture by a retaining element fixed to the end of each pin.

15. The automotive power transmission chain and sprocket drive as recited in claim 11, wherein each end of the ceramic pin is provided with a groove in the pin surface, the pin ends protrude through the guide link plate apertures and the pin ends are held in the aperture by material from the guide plate displaced into the circumferential groove.

16. The automotive power transmission chain and sprocket drive as recited in claim 1 wherein the ceramic material is effective to reduce the elongation of the chain by at least about 10% relative to a chain wit steel pivots after about 50 hours of operation under automotive driving conditions.

17. An automotive power transmission chain and sprocket drive subject to fluctuating loads over a range of chain speeds comprising a continuous loop chain for controlling timing of one or more systems of an internal combustion engine, the chain having a plurality of sets of links, and pivots joining successive sets of the links to permit articulation of each set of links relative to adjacent sets of links, the pivots comprise ceramic material effective to reduce the elongation of the chain by at least about 10% relative to the elongation of the chain with steel pivots for ten hours when the chains are subjected to 100 pounds of tension at 3250 rpm, and the ceramic material is selected from the group consisting of toughened alumina, alumina/zirconia composites, alumina/zirconia composites incorporating a rare earth oxide, composites having a metastable tetragonal zirconia crystal content, stabilized zirconia composites, aluminum nitride, boron carbide, beryllia, sapphire, and combinations thereof; and a chain driving sprocket and chain driven sprocket each having means for operatively engaging the chain, at least one link of each set comprises at least two outer link plates and at least two inside link pates, at least one outer link plate and at least on inside link plate in interfacial contact with each other, and the pivots comprise rocker joints containing the ceramic material, the rocker joints including a long rocker pin and a short rocker pin, and the long rocker pin extending completely through an aperture of the outer link plates to join one outermost link plate to an opposite outermost link plate of a given set, and the short rocker pin extending partly, but not completely, through an aperture of the outermost inside link plates, in an adjacent row of link plates such that the short rocker pin and long rocker pin in the aperture are operable to reek against each other.

18. A method of reducing the elongation of an automotive power transmission chain of an internal combustion engine comprising:

operatively engaging a continuous loop chain with a drive sprocket the chain having a plurality of sets of links, and pivots joining successive sets of the links, to permit articulation of each set of links relative to adjacent sets of links, the pivots comprise ceramic material effective to reduce elongation of the chain by at least about 10% relative to the elongation of the chain with steel pivots when the chains are subjected to a tension of 100 pounds for ten hours at 3250 rpm, and the ceramic material is selected from the group consisting of toughened alumina, alumina/zirconia composites, alumina/zirconia composites incorporating a rare earth oxide, composites having a metastable tetragonal zirconia crystal content, stabilized zirconia composites, aluminum nitride, boron carbide, beryllia, sapphire, and combinations thereof;

driving the chain around the drive sprocket to impart rotational movement in the chain and to control timing of the internal combustion engine.

19. The method as recited in claim 18, wherein the pivots are rocker joints comprising the ceramic material, the rocker joints including a long rocker pin and a short rocker pin, and the long rocker pin extending completely through an aperture to join one outermost link to the opposite outermost link of a given set, and the short rocker pin extending partly, but not completely, through the same aperture, such that the short rocker pin and long rocker pin in the aperture are operable to rock against each other.

20. The method as recited in claim 18, wherein the pivot comprises a curved pin of the ceramic material.

21. An automotive power transmission chain and sprocket drive subject to fluctuating loads, comprising:

a sprocket having sprocket teeth, and a chain operable over a range of engine speeds comprised of a plurality of sets of links operatively engaging the sprocket teeth, and pivots joining successive sets of the links to permit articulation of each set of links relative to adjacent sets of links, wherein the pivots include ceramic material effective to reduce the elongation of the chain by at least about 18% relative to the elongation of the chain wit steel pivots as determined after about 10 hours of operation at 3250 rpm under a tension of 100 pounds and under automotive driving conditions, and the ceramic material is selected from the group consisting of zirconia with a metastable tetragonal zirconia crystal content, alumina, alumina/zirconia composites, silicon nitride, aluminum nitride, silicon carbide, boron carbide, beryllia, sapphire, and combinations thereof.

* * * * *